Patented Nov. 25, 1930

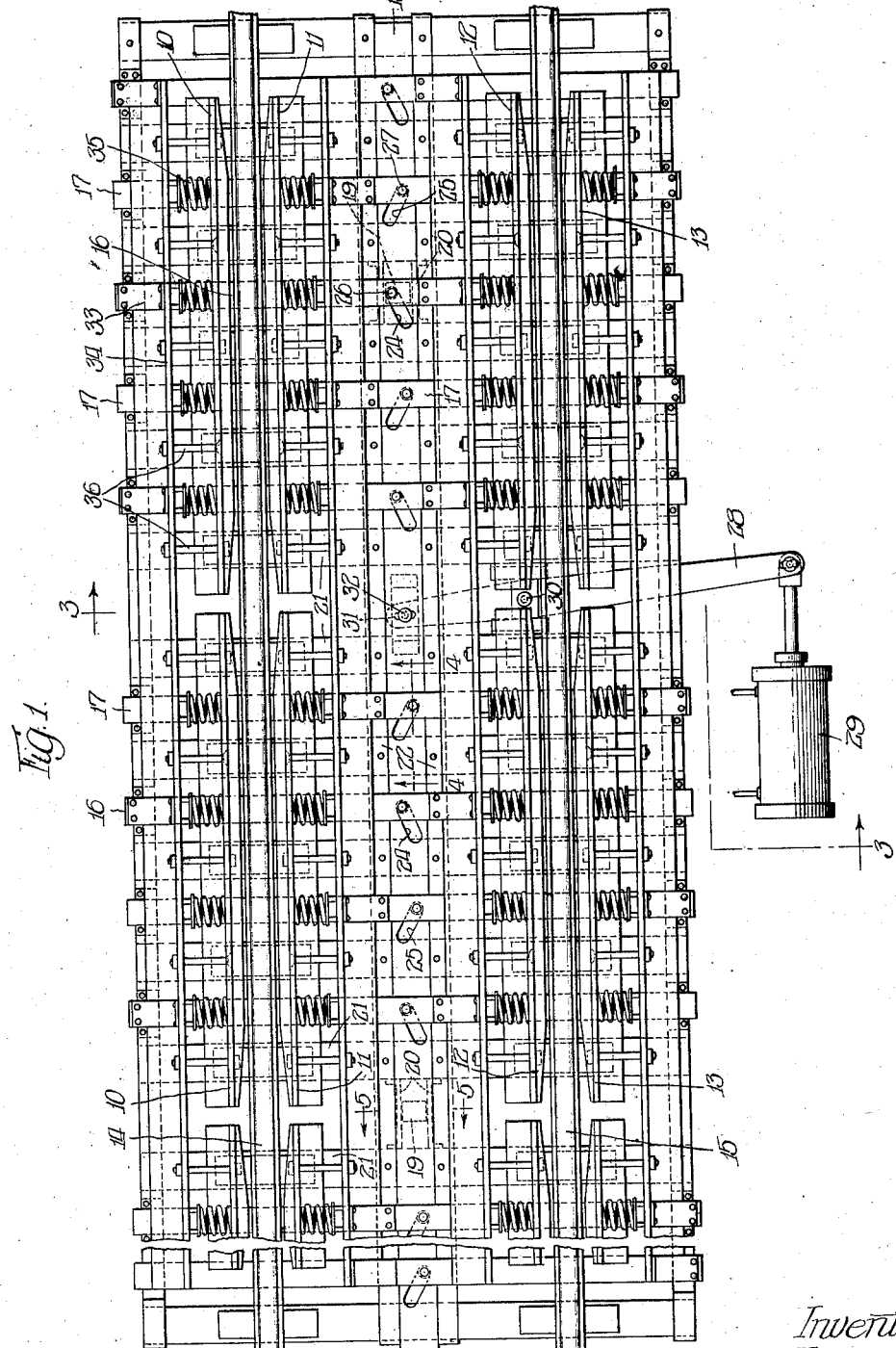

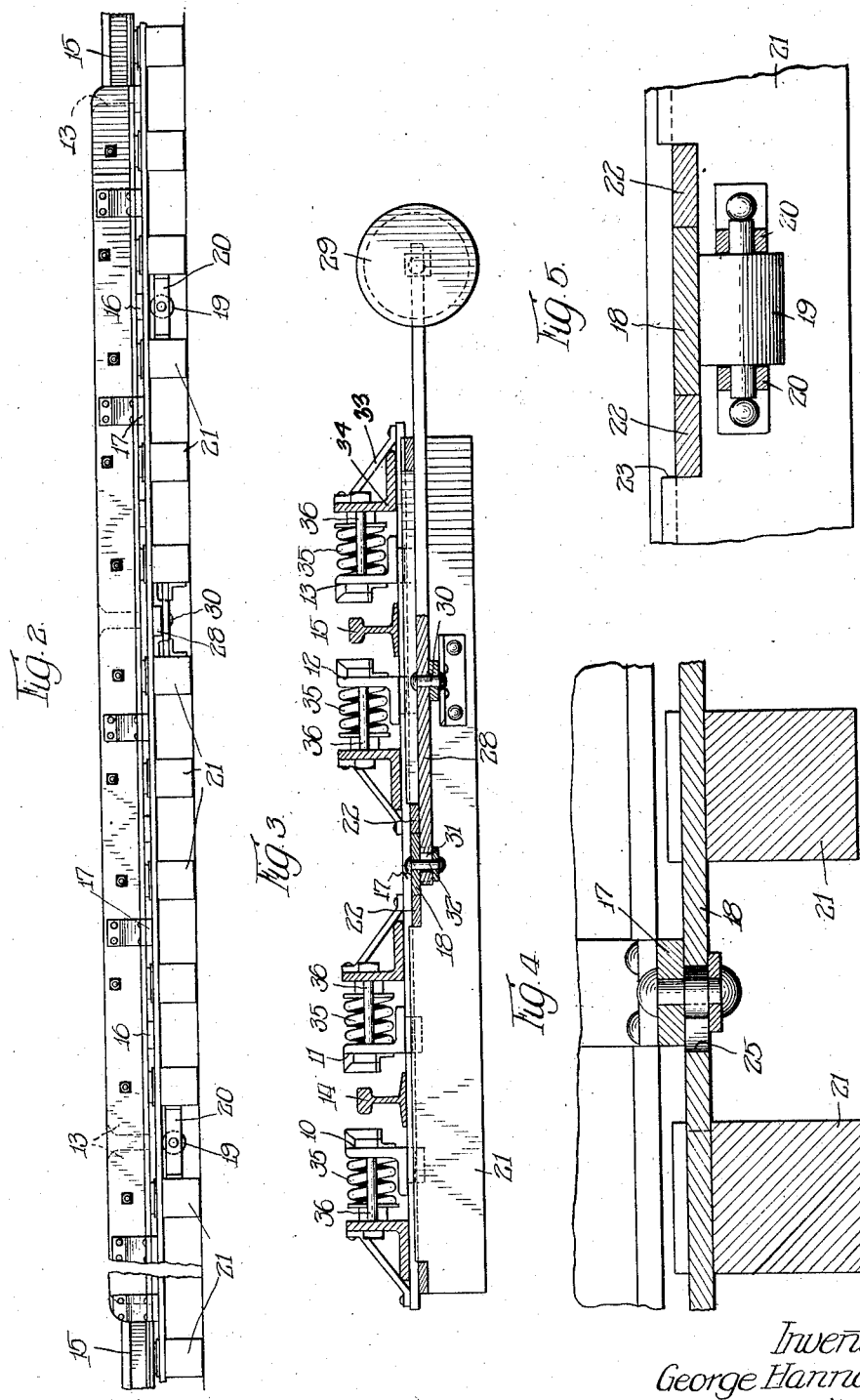

1,782,874

UNITED STATES PATENT OFFICE

GEORGE HANNAUER, OF CALUMET CITY, ILLINOIS, AND EDGAR M. WILCOX, OF HAMMOND, INDIANA, ASSIGNORS TO HANNAUER CAR RETARDER COMPANY, OF CHICAGO, ILLINOIS, A CORPORATION OF ILLINOIS

TRACK-BRAKE MECHANISM

Application filed March 29, 1926. Serial No. 98,123.

This invention relates to track brake mechanism.

One object of the invention is to simplify track brake mechanism, reduce the number of parts, reduce the amount of space occupied by the brake mechanism to a minimum, provide brake mechanism which requires a minimum amount of power to operate, and one which may be maintained at minimum expense.

Another object is to provide track brake mechanism which is adapted to meet the various requirements under service conditions.

These and other objects are accomplished by means of the arrangement disclosed by the accompanying sheets of drawings, in which—

Figure 1 is a fragmentary top plan view of a system of track brakes and control mechanism therefor embodying our invention;

Figure 2 is a fragmentary side elevation of the same arrangement;

Figure 3 is a sectional view on an enlarged scale taken in the plane of line 3—3 of Figure 1;

Figure 4 is a fragmentary enlarged sectional view taken in the plane of line 4—4 of Figure 1; and Figure 5 is a fragmentary enlarged sectional view taken in the plane of line 5—5 of Figure 1.

The various novel features of the invention will be apparent from the following description and drawings, and will be particularly pointed out in the appended claims.

Referring to the figures of the drawings, it will be noted that the invention is illustrated in connection with track brakes 10, 11, 12 and 13, shown in a plurality of sections, track brakes 10 and 11 being mounted on opposite sides of one rail 14, and track brakes 12 and 13 being mounted on opposite sides of the other rail 15. As fully described in our copending application, Serial No. 682,581, filed December 24, 1923, the track brakes 10 and 12 when given their brake application movements are yieldably pressed in one direction through spaced transversely arranged members 16, and track brake members 11 and 13 are yieldably pressed in the opposite direction through spaced transversely arranged members 17. Said members 16 and 17 respectively are operatively connected to a primary actuating bar 18 which is centrally and longitudinally disposed between the track rails 14 and 15. This bar is mounted for longitudinal movement upon antifriction members or rollers 19 which are suitably supported in brackets 20 secured to ties 21. This longitudinally extending actuating member 18 is mounted between guide bars 22 which are mounted on and secured in recessed portions 23 of the ties 21. The actuating bar 18 is provided with two series of slots or cam portions, one series including slots 24 and the other series including slots 25. Slots 24 extend angularly in one direction with respect to the actuating bar 18, and slots 25 extend angularly in another direction with respect to said bar. The transversely extending members 16 have pins 26 which are operable in said slots 24, and the transversely extending members 17 have pins 27 which are operable in slots 25. From the arrangement thus far described, it will be apparent that if the actuating bar 18 is moved to the right as viewed in Figure 1, the bars 16 and 17 will be moved transversely in opposite directions for giving the brakes 10, 11, 12 and 13 a braking movement. Likewise, when the actuating member 18 is given a reverse movement, the brakes will be given a brake releasing movement.

The main actuating bar 18 preferably is actuated through a lever 28 which in turn receives its motion from a fluid pressure piston (not shown) operable within the cylinder 29. The lever 28 is fulcrumed at an intermediate point 30, and at its inner end has an elongated slot 31 which receives a pin 32 which passes through the longitudinally extending actuating member 18.

Preferably the transversely extending members 16 and 17 are provided with brackets 33 which transmit pressure to associated backing bars 34 between which and the brake shoes, springs 35 are mounted, whereby the braking pressures are yieldably exerted. Spacing bolts 36 which extend between the brakes and the backing members 34 limit the action of the springs 35 in separating same.

By means of this arrangement a full braking movement with sixty pounds pressure is obtained as compared with one hundred and ten pounds used on some other arrangements.

By means of the arrangement hereinabove described, the objects of the invention are accomplished.

We claim:

1. In a device of the character described, the combination of rails, resiliently mounted brakes on both sides of each rail, means connecting alternate brakes, longitudinal operating means disposed between the rails and having slots disposed angularly with respect to said rails, and pins on said first named means extending in said slots for moving said brakes into braking position.

2. In track brake mechanism, the combination of a pair of track rails, track brakes on both sides of said rails and adapted to be moved into engagement with vehicle wheels for retarding movement of said wheels, a longitudinal member extending lengthwise of the rails and having angularly disposed slot portions, members alternately connected to each of said track brakes, said members having pins for cooperating with each of said slot portions, and means for actuating said longitudinal member for actuating said brakes.

Signed at Chicago, Illinois, this 26th day of March, 1926.

GEORGE HANNAUER.
EDGAR M. WILCOX.